United States Patent [19]

Aragon

[11] Patent Number: 5,413,529
[45] Date of Patent: May 9, 1995

[54] MULTI-COMPONENT HOUSING

[75] Inventor: Joel T. Aragon, Everett, Wash.

[73] Assignee: Intermec Corporation, Everett, Wash.

[21] Appl. No.: 119,464

[22] Filed: Sep. 9, 1993

[51] Int. Cl.⁶ .............................................. F24F 9/00
[52] U.S. Cl. ..................................... 454/251; 454/187
[58] Field of Search .................... 454/60, 187, 251, 49

[56] References Cited

U.S. PATENT DOCUMENTS

| | | | |
|---|---|---|---|
| 4,838,150 | 6/1989 | Suzuki et al. | 454/187 |
| 4,873,914 | 10/1989 | Hirayama | 454/187 |
| 4,917,004 | 4/1990 | Okamoto et al. | 454/251 |
| 4,923,352 | 5/1990 | Tamura et al. | 454/251 |
| 5,086,422 | 2/1992 | Hagiya et al. | 369/71 |

*Primary Examiner*—Henry C. Yuen
*Attorney, Agent, or Firm*—L. David Rish

[57] ABSTRACT

A multi-compartment outer housing, positioned in an ambient fluid having an ambient pressure P, has a compressor developed fluid flow through the outer housing compartments. A multi-chamber inner housing is positioned in a housing compartment having a fluid pressure greater than the ambient pressure P. This inner housing has a sealed equipment chamber, a still-fluid chamber, and an optically transparent wall between the equipment and still-fluid chambers. The still-fluid chamber has a restricted port at its distal or lee end which places the still-fluid chamber in fluid communication with the housing compartment. The inner housing is oriented relative to a fluid egress port in this housing compartment so that the optically transparent wall, the equipment chamber and the fluid egress port are placed in a line-of-sight alignment through the restricted port of the still-fluid chamber. This orientation of the inner housing further minimizes solid particle build up within the still-fluid chamber, and an electrostatic charge build up on the optically transparent wall.

20 Claims, 2 Drawing Sheets

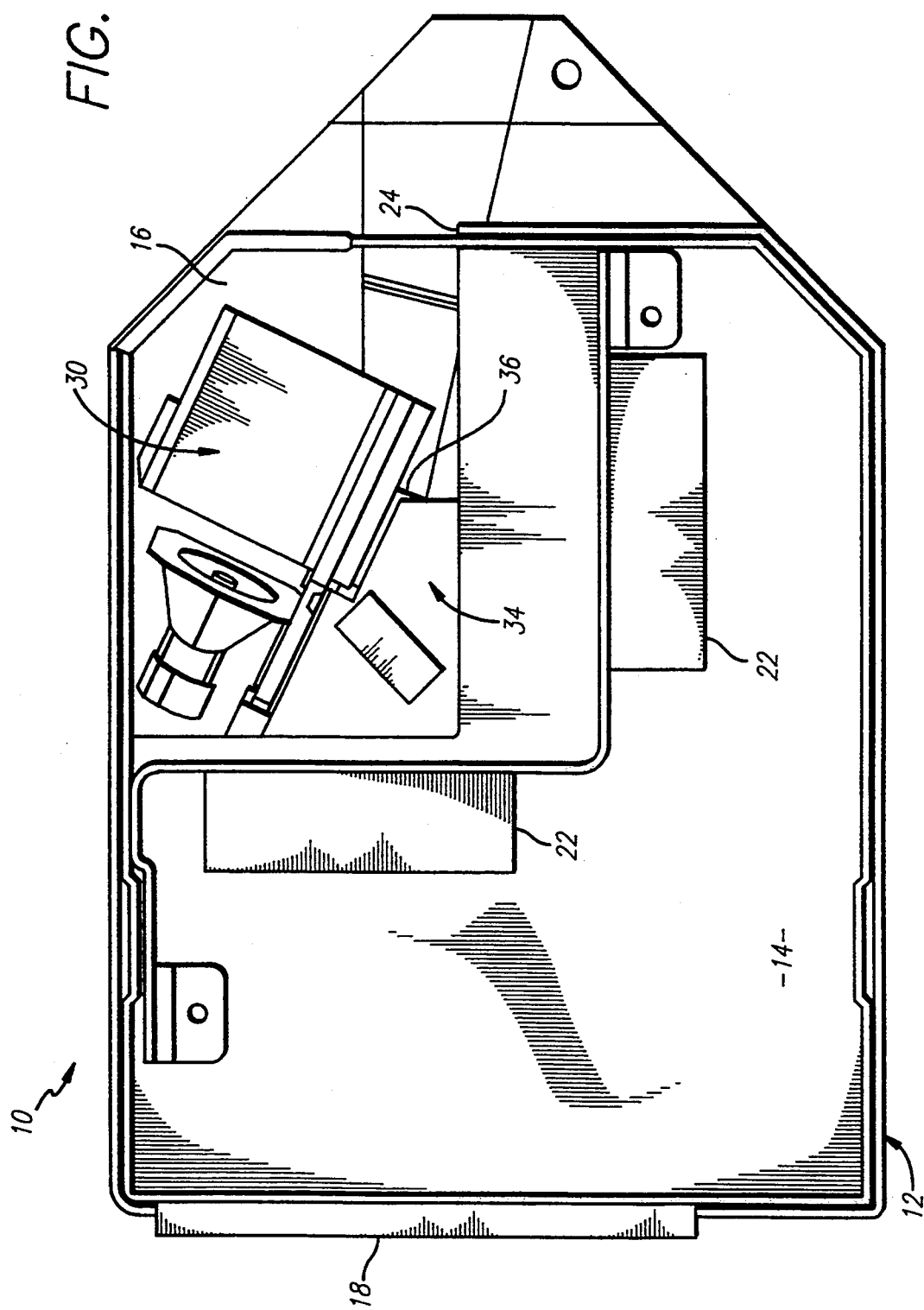

MULTI-COMPONENT HOUSING

BACKGROUND OF THE INVENTION

1. Field of the Invention

A multi-compartment housing having means both to contain equipment in a cavity positioned within the housing, and to maintain a high pressure, relatively clean environment within the housing by a directed fluid flow through the housing around the cavity.

2. Description of Related Art

The protection of sensitive equipment in a hosthe environment is a continuing challenge to electrical and mechanical designers. Often this equipment can be extremely sensitive to the adverse effects of solid particulates, such as dust, that may be carried by a fluid atmosphere. These effects can include dust contamination of the equipment, or dust build up from an electrostatic charge, or the like; all potentially leading to early equipment failure or malfunction.

U.S. Pat. No. 5,086,422 for an OPTICAL DISK APPARATUS teaches the use of a U-shaped seal within a case to "keep dust from the optical parts", i.e., an optical pickup. The '422 Patent teaches that "dust contained in the atmosphere . . . or air" can be carried by "forced-air cooling" of the case. The seal taught by the '422 Patent guides this forced air toward selected heat sources within the case "to prevent the internal temperature of the optical disk apparatus from rising." However, the U-shaped seal has an open end at its downstream or lee side so that the optical pickup is exposed to the flow of forced air through the case. It would appear that any eddy currents in the flow of forced air at or near the lee side of the U-shaped seal could propel unwanted dust into the seal cavity around the optical pickup.

U.S. Pat. No. 4,306,835 for an AIR PURGING UNIT FOR AN OPTICAL PYROMETER OF A GAS TURBINE ENGINE teaches the use of a fluid screen adjacent to the exposed surface of an optical lens of the pyrometer. A sight tube, connected to the pyrometer unit, has a plurality of spaced and angled apertures at its mounted end which direct pressurized air into the sight tube to egress from its distal end. Thus the sight tube is an open-ended chamber with a dynamic flow of air through the chamber. It would appear that (1) this flow of air provides an opportunity for an electrostatic charge to build up on the optical lens, and (2) any unwanted solid particulates, such as dust, which may be carried by this flow of air could be attracted to and collect on the lens.

OBJECTS OF THE INVENTION

Accordingly, it is an object of the invention to provide a new and improved multi-compartment housing that prevents solid particles, including particulates, from accumulating within the housing and on the housing walls.

It is an object of the invention to provide a multi-compartment housing which contains an equipment chamber that eliminates both the accumulation of solid particles in the equipment chamber and on its walls, and that provides cooling of the chamber walls.

It is an object of the invention to provide a multi-compartment housing that substantially minimizes or eliminates the build up of an electrostatic charge on the equipment chamber walls; particularly, on an optically transparent chamber wall.

It is an object of the invention to provide a multi-compartment housing that substantially minimizes stray electromagnetic radiation, such as visible light, from reaching the optically transparent chamber wall.

SUMMARY OF THE INVENTION

Briefly, in accordance with one form of the invention, a new and improved multi-compartment housing, which can be positioned in an ambient fluid having an ambient pressure P, has an outer housing wall that defines an enclosed volume with at least first and second compartments therein. A filter in the housing wall provides a filtered ingress from the ambient fluid to the first compartment, while a fluid egress port having a selected size opening in the housing wall permits the restricted egress of fluid from the second compartment to the ambient fluid. A compressor or fan positioned between the first and second compartments maintains a fluid pressure in the first compartment at a pressure less than the ambient pressure P, and a fluid pressure in the second compartment at a pressure greater than the ambient pressure P. A multi-chamber inner housing, positioned within the second o compartment, includes an equipment chamber sealed from the second compartment fluid pressure, a still-fluid chamber, and an optically transparent wall between the equipment and still-fluid chambers. The still-fluid chamber has a restricted port at its distal or lee end which places the still-fluid chamber in fluid communication with the second compartment. The inner housing is oriented relative to the second compartment egress port so that the optically transparent wall, the equipment chamber and the egress port are placed in a line-of-sight alignment through the restricted port of the still-fluid chamber.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings(s).

BRIEF DESCRIPTION OF THE DRAWINGS

FIG. 2 is a plan view, in cross section, of one multi-compartment housing formed in accordance with the invention and functionally similar to the housing of FIG. 1.

DESCRIPTION OF THE PREFERRED EMBODIMENT(S)

Figure 1:
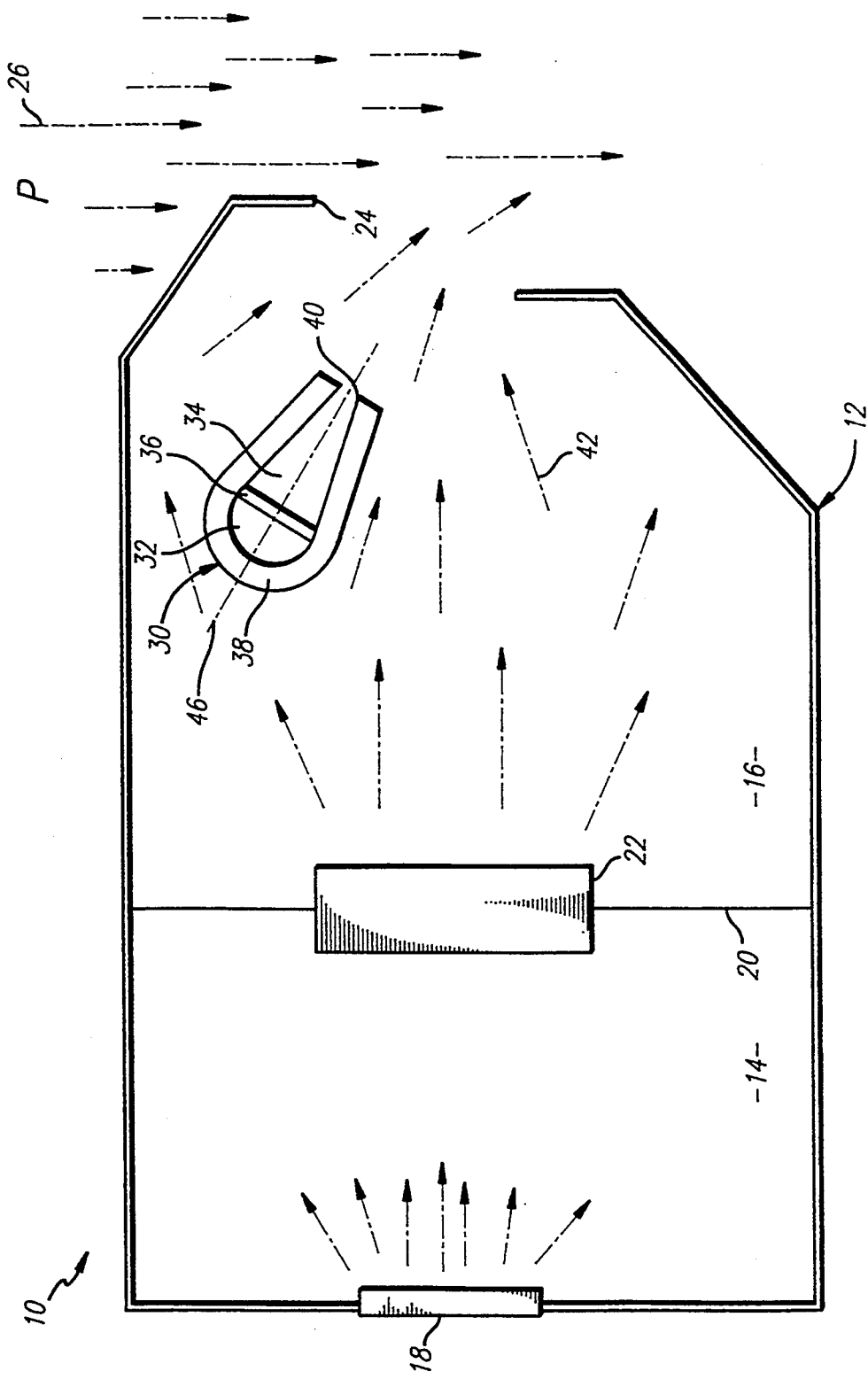
FIG. 1 is a schematic of the multi-compartment housing of the invention and the functional relationship of its parts.

Referring to FIG. 1, the multi-compartment housing 10 of the invention has an outer housing wall 12 that encloses a clean air compartment 14 and an adjoining pressurized compartment 16. A solids filter 18 positioned through the outer wall 12 of compartment 14 provides filtered ingress to the clean air compartment. Since the clean air compartment 14 opens into a relatively larger cross section or volume immediately following the filter 18, this increase in cross section slows the flow of air within compartment 14 which allows unfiltered dust particles to settle out. A common wall 20 between the compartments 14 and 16 supports at least one powered fan 22 that is ported to each of the compartments so that "clean" air moves from compartment 14 into the "pressurized" compartment 16. An egress port 24 in the outer housing wall 12 of compartment 16 has a selected exit area that complements the air flow resistance of filter 18 and the compressor capacity of fan 22 so that the pressure in compartment 14 is less than the ambient pressure (which is the pressure P as measured outside the outer housing wall 12), and the pressure in compartment 16 is greater than the ambient pressure P. These pressure differentials between the clean compartment 14 and the pressurized compartment 16 maintain a relatively constant ingress of air through filter 18 and egress of air through egress port 24.

The orientation of egress port 24 in the outer housing wall 12 relative to the whole housing when the multi-compartment housing 10 of the invention is positioned generally perpendicular to the flow of an ambient air (as represented by flow arrows 26) at pressure P, develops a laminar flow as the air egresses from the second compartment and blends with the ambient air flowing past the housing 10. The egress port 24 is also orientated to ambient air flow to prevent ambient air flow from entering compartment 16 via port 24.

A multi-chamber inner housing 30 is positioned within the pressurized compartment 16, and includes an equipment chamber 32 and a still-fluid chamber 34. The equipment chamber 32 is a sealed chamber with an optically transparent wall 36 common with the still-fluid chamber 34. In this embodiment of the invention, the inner housing 30 has a generally horseshoe shape in longitudinal cross section as shown. Here, the optically transparent wall 36 is positioned across the bight 38 of the horseshoe-shaped inner housing 30. While the equipment chamber 32 is sealed from the pressurized compartment 16, the still-fluid chamber 34 has a restricted port 40 which permits an equalization of pressure between the pressurized compartment 16 and the still-fluid chamber 34. Since the air flow through the multi-compartment housing 10 of the invention is from the filter 18 to the egress port 24 (as represented by flow arrows 42), the inner housing 30 is positioned within the pressurized compartment 16 with the bight 38 of the inner housing functioning as a leading edge or surface to the oncoming air flow through the multi-compartment housing 10. In this orientation of the inner housing 30, the restricted port 40 is considered to be at the lee end or side of the inner housing 30 since it is relatively sheltered from the oncoming air flow (flow arrows 42). This orientation of the still-fluid chamber 34 substantially minimizes entry of moving air into the chamber 34, while any dust particle that may remain and enter the chamber has a still environment in which to settle prior to physically reaching the optically transparent wall 36. Because of the relative absence of air movement in the still-fluid chamber 34, there is also minimal opportunity for an electrostatic charge build up therein, particularly on the optically transparent wall 36, which is a physical result of air movement.

The precise orientation and shape of inner housing 30 is primarily dependent upon the type of equipment that is contained within the sealed equipment chamber 32. For example, the equipment chamber 32 could contain a source of electromagnetic radiation, such as visible light. Where the source of visible light is an illuminator, such as a conventional light bulb (not shown), the visible light passes initially through the optically transparent wall 36, which here can be an optically clear glass wall, and then egress port 40 in the line-of-sight alignment of these components with the longitudinal axis 46 of inner housing 30 as schematically shown by FIG. 1. This alignment with the longitudinal axis 46 permits the accurate positioning of the inner housing 30 relative to the egress port 24 of the pressurized compartment 16. Thus, light can pass unobstructed from the conventional light source (not shown) to and through the egress port 24 of outer housing wall 12.

An illuminator such as a conventional light bulb is a known heat generator. The flow of air through the pressurized compartment 16 and around the leading surface formed by bight 38 of the inner housing 30 functions to cool the equipment chamber 32 therein. Further, one or more fans, such as fan 22, can be positioned in or by common wall 20 to provide increased air flow directly on the leading surface of the inner housing. Also, the fans can be (are) used to cool other equipment in the pressurized compartment 16.

Other equipment can also be placed in the sealed equipment chamber 32 (or other equipment chambers within similar multi-chamber inner housings); for example, a conventional camera apparatus designed for use in a Wide Area Bar Code Reader (WABCR) as shown by FIG. 2 and available from the Intermec Corporation, P.O. Box 4280, Everett, Wash. 98203. When a camera is placed in the sealed equipment chamber 32, the restricted port 40 of inner housing 30 further functions to reduce stray light from entering the still-fluid chamber 34 and equipment chamber.

It is contemplated that the multi-compartment housing 10 of the invention can find use in an atmosphere, other than air, which has one or more selected gases. While the preferred embodiment of the invention as described is intended to substantially minimize or eliminate dust from the still-fluid chamber 34 of inner housing 30, it is understood that other solid particles including particulates can similarly be excluded.

As will be evidenced from the foregoing description, certain aspects of the invention are not limited to the particular details of construction as illustrated, and it is contemplated that other modifications and applications will occur to those skilled in the art. It is. therefore, intended that the appended claims shall cover such modifications and applications that do not depart from the true spirit and scope of the invention.

What is claim is:

1. A multi-compartment housing, positioned in an ambient fluid having an ambient pressure P, comprising:
   a) an outer housing wall defining an enclosed volume,
   b) at least first and second compartments formed within said enclosed volume, including heat generating equipment in at least one of said at least first and second compartments,
   c) a fluid egress port in said housing wall for the restricted egress of fluid front said second compartment to the ambient fluid,
   d) filter means in said housing wall providing a filtered ingress from the ambient fluid to said first compartment,
   e) compressor means positioned between said first and second compartments to maintain fluid pressure in said first compartment at a pressure less than the ambient pressure P, and to maintain fluid pressure in said second compartment at a pressure greater than the ambient pressure P, and f) a multi-chamber inner housing positioned within said second compartment defining an inner housing volume including:
  1) an equipment chamber defining a first chamber volume within said inner housing volume that is scaled from said second compartment fluid pressure,
  2) a still-fluid chamber defining a second chamber volume within said inner housing volume and having a restricted port placing said second chamber volume in fluid communication with said second compartment, and
  3) an optically transparent wall between said first and second chamber volumes placing said equipment chamber in a line-of-sight alignment with said second compartment fluid egress port through said restricted port.

2. The multi-compartment housing of claim 1 in which said first compartment volume is a clean fluid compartment that further contains a solid particulates settling region.

3. The multi-compartment housing of claim 1 in which said fluid egress port from said second compartment has a selected exit area that maintains said selected pressure greater than the ambient pressure P.

4. The multi-compartment housing of claim 1 in which said ambient fluid is dynamic and flowing relative to said housing.

5. The multi-compartment housing of claim 4 in which said fluid egress port is oriented to develop a laminar flow as the fluid egress from said second compartment and blends with the ambient fluid flowing past the housing.

6. The multi-compartment housing of claim 1 in which the ambient fluid is atmosphere.

7. The multi-compartment housing of claim 6 in which said atmosphere is at least one selected gas.

8. The multi-compartment housing of claim 1 in which said equipment chamber and second compartment can include heat generating equipment effectively cooled by a flow of fluid through said second compartment volume as developed by both said compressor means and said fluid egress port of said second compartment.

9. The multi-component housing of claim 8 in which said heat generating equipment includes an illuminator device.

10. The multi-compartment housing of claim 9 in which said equipment chamber includes a camera.

11. The multi-compartment housing of claim 1 in which said still-fluid chamber substantially eliminates the possibility of solid particulates entering said still chamber volume and minimizes the development of an electrostatic charge on said optically transparent wall as a result of said flow of fluid through said second compartment around said inner housing.

12. The multi-compartment housing of claim 1 in which said still-fluid chamber port is restricted.

13. The multi-compartment housing of claim 12 in which said restricted port of said still-fluid chamber is positioned, relative to said compressor means, on a lee side of said inner housing.

14. The multi-compartment housing of claim 13 in which said inner housing has a generally horseshoe shape in longitudinal cross section.

15. The multi-compartment housing of claim 14 in which said optically transparent wall is positioned across the bight of said inner housing horseshoe shape.

16. The multi-compartment housing of claim 1 in which said optically transparent wall is optically clear glass.

17. A multi-compartment outer housing, positioned in an ambient fluid having an ambient pressure P comprising:
  a) first means to generate a flow of ambient fluid from an outer housing ingress in a first compartment having a pressure less than the ambient pressure P, through a second compartment having a pressure greater than the ambient pressure P, to exit from said second compartment through an outer housing egress in said second compartment;
  b) second means to filter solid particulates from said flow of ambient fluid through the outer housing:
  c) third means positioned within said second compartment in said flow of fluid through the housing, said third means including an equipment chamber having heat generating equipment in at least one of said at least first and second compartments, to protect equipment positioned therein, and an adjoining still-fluid chamber having a restricted port to said second compartment to substantially eliminate any remaining solid particulates carried by said flow of fluid through the outer housing, said port positioned on a lee side of said third means and oriented for a line-of-sight alignment of said equipment chamber with said outer housing egress; and,
  d) optically transparent means in said third means positioned between said equipment chamber and said still-fluid chamber so that equipment positioned within said third means equipment chamber has a clear optical path to said outer housing egress.

18. The multi-compartment outer housing of claim 17 in which said second means is positioned in said first compartment, and further includes a settling region within said first compartment so that solid particulates can settle out of said flow of fluid through the housing.

19. The multi-compartment housing of claim 17 in which said port reduces stray electromagnetic radiation, such as visible light, from said equipment chamber.

20. The multi-compartment housing of claim 17 in which said still-fluid chamber provides a relatively still body of fluid that substantially minimizes an electrostatic charge build up on said optically transparent means.

* * * * *